United States Patent Office 3,594,366
Patented July 20, 1971

3,594,366
PROCESS FOR THE PREPARATION OF AMINO-
ALICYCLIC AND AMINOARYLALICYCLIC
PENICILLINS
Norman H. Grant, Wynnewood, Donald E. Clark, Norristown, and Harvey E. Alburn, West Chester, Pa., assignors to American Home Products Corporation, New York, N.Y.
No Drawing. Continuation of application Ser. No. 656,668, July 28, 1967. This application Nov. 26, 1968, Ser. No. 779,234
Int. Cl. C07d 99/16
U.S. Cl. 260—239.1
5 Claims

ABSTRACT OF THE DISCLOSURE 6-(1-aminocycloalkanecarboxamido) and 6-(1-aminoarylcycloalkanecarboxamido) penicillanic acids with broad spectrum antibacterial activity are obtained rapidly and in high yield, without the need to isolate them from dilute solutions, by an improved process comprising condensing and precipitating in one step the product from the addition of an N-carboxyanhydride of an amino acid to a highly concentrated, e.g. 5–40% by weight, aqueous suspension of 6-aminopenicillanic acid.

---

This application is a continuation of copending application Ser. No. 656,668, filed July 28, 1967, now abandoned.

This invention relates to the preparation of penicillins and more particularly to an improved method for preparing 6-(1-aminocycloalkanecarboxamido) and 6-(1-aminoarylcycloalkanecarboxamido) penicillanic acids, which, together with their non-toxic salts, show a desirable broad spectrum of anti-bacterial activity.

BACKGROUND OF THE INVENTION

The instant invention contemplates improvements in the preparation of pencillins of Formula I:

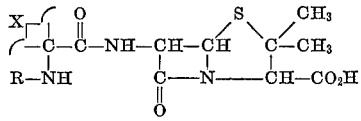

wherein R is hydrogen or lower alkyl, straight or branched chain, preferably of from about 1 to about 6 carbon atoms, for example, methyl, ethyl, n-propyl, i-propyl, n-butyl, t-butyl, n-pentyl, 3-methylpentyl, n-hexyl, and the like, and X is

wherein $n$ is a whole number of from 2 to 9; or

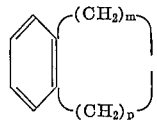

wherein $m$ is 0 or 1 and $p$ is a whole number of from 1 to 3.

As is disclosed in U.S. 3,194,802, compounds such as those of Formula I and their salts have potent activity against gram-negative and gram-positive microorganisms. They thus are useful as therapeutic agents in poultry and mammals, including man, in the treatment of infectious diseases caused by gram-positive and grma-negative bacteria, upon either parenteral or oral administration. They also have use as supplements in animal feed.

Heretofore it has been proposed to prepare these valuable penicillins by condensing 6-aminopenicillanic acid (6–APA) with an N-carboxy anhydride (NCA) of the appropriate alicyclic or arylalicyclic amino acid, forming the penicillin and splitting off carbon dioxide. However, these proposals have been viewed generally pessimistically because of the liability of the said N-carboxyanhydride to undergo extremely facile polymerization. Instead of obtaining the desired penicillin, there are obtained dipeptides and large polypeptides, and sustantial amounts of amino acid (from the anhydride), N-carboxyamino acid, various carbamic acids, ureido derivatives and hydantoins. More recently a means has been found to condense 6-APA with the N-carboxyanhydride and avoid the problems caused by the above mentioned polymerization reactions and hydrolyses. This means employs the surprising finding that the condensation goes smoothly in an aqueous medium, substantially free of organic solvents, on the acid side of neutrality, with retention of configuration and no hydrolysis. The aforesaid process resulted from a study of many variables including pH, solvent type, concentration of reactants, effect of added detergents and of added amines, and reactant ratios and the study is discussed by N. H. Grant and H. E. Alburn in J. Am. Chem. Soc., 86, 3870 (1964). In referring to the condensation of the N-carboxyanhydride with 6–APA, it is therein stated that "Raising the concentration of either reactant above 1% brings a levelling off in the extent of conversion." As a result, for some time, those skilled in the art have employed reaction mixtures containing at most about 1% (and often even less concentrated solutions) of the reactants. It will be recognized, and, in fact, it is taught, that recovery of the penicillin prepared by condensation in such dilute solutions will involve isolation of a relatively small amount of desired product from a large amount of solvent. It is immediately obvious that it would be advantageous to provide a means to eliminate the necessity for a separate isolation step. Heretofore, isolation of product has been achieved in several ways, all with attendant shortcomings. If the solvent is the major contaminant then isolation can be carried out by solvent removal, for example, by evaporation or, in certain cases, freeze-drying. Thus, in U.S. 3,194,802, cited above, the product is isolated by freeze-drying. The disadvantages of freeze-drying are that very large volumes must be handled, and the product is light, fluffy and amorphous, making subsequent formulation into useful dosage forms difficult or impossible without a densification step. Removal of a solvent by evaporation can result in a crystallization of the product, but it is difficult with a high boiling solvent, such as water; very elaborate and expensive equipment is necessary in order to keep the temperature low enough to avoid decomposing the product. A third method—precipitation of the product as an insoluble salt such as an arylsulfonate— requires the extra costly steps of acidification, reconstitution of the precipitate and decomposition of the salt. It has now been found possible to accomplish the preparation of the penicillin in essentially a one step process wherein the condensation and isolation is carried out in a very concentrated system, e.g., from about 5% to about 40% by weight of 6–APA. This is especially surprising in view of the present state of the art which clearly teaches that reactant concentrations above 1% will cause lower yields to be obtained. In fact, with the instant process, not only does the desired product precipitate from the reaction mixture whereby it can be simply collected by filtration, centrifugation and the like, but it is obtained in much higher yields than heretofore thought possible.

It is, accordingly, a primary object of the instant invention to provide an improved means to obtain aminoalicyclic- and aminoarylalicyclic penicillins.

It is a further object to provide aminoalicyclic- and aminoarylalicyclic penicillins in better yield than heretofore, especially on a large scale.

A further object of the instant invention is to provide aminoalicyclic- and aminoarylalicyclic penicillins by a means which avoids the need to freeze-dry large volumes of solution, crystallize them from dilute solutions, or precipitate them as insoluble salts from dilute solutions.

Still another object of this invention is to provide aminoalicyclic- and aminoarylalicyclic penicillins in a form which does not require densification prior to formulation into pharmaceutical dosage forms.

DESCRIPTION OF THE INVENTION

These and other objects readily apparent to those skilled in the art are achieved by practice of the instant invention which is, in essence: In a process for the preparation of a penicillin of Formula I:

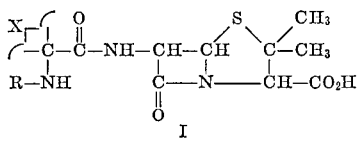

wherein R is hydrogen or lower alkyl and X is

wherein $n$ is a whole number of from 2 to 9; or

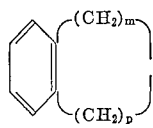

wherein $m$ is 0 or 1 and $p$ is a whole number of from 1 to 3, by condensing 6-aminopenicillanic acid (II) with an N-carboxyanhydride of an alicyclic- or arylalicyclic amino acid of Formula III:

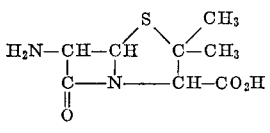 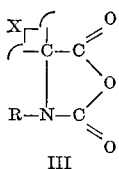

II    III wherein X and R are as above defined, until formation of said penicillin is substantially complete, and recovering said penicillin, the improvement which comprises adding a stoichiometrically equivalent amount of said N-carboxyanhydride to an aqueous medium containing from about 5% to about 40% by weight of said 6-aminopenicillanic acid at a temperature range of from about 0° C. to about 70° C., maintaining the mixture within said temperature range until formation and precipitation of said penicillin is substantially complete and collecting the precipitated penicillin.

Special mention in made of several valuable embodiments of this invention. These are:

A process as defined above wherein said aqueous medium is maintained at a pH range of from about 5 to about 7. This embodiment provides optimum yields of product.

A process as defined above wherein said N-carboxyanhydride is added portionwise in from about two to about six substantially equal batches and the mixture is mixed vigorously during the addition and during the formation of said aminoalicyclic- or aminoarylalicyclic penicillin. This embodiment provides high yields of product in a relatively short time and the product is in especially useful form for recovery and formulation into dosage forms, without densification.

A process as defined above wherein the N-carboxyanhydride is N-carboxy-1-aminocyclohexanecarboxylic acid anhydride. This embodiment provides the valuable penicillin, 6 - (1 - aminocyclopentanecarboxamido)-penicillanic acid.

A process as defined above wherein the N-carboxyanhydride is N-carboxy-1-aminocyclopentanecarboxylic acid anhydride. This embodiment provides the valuable penicillin, 6 - (1 - aminocyclopentanecarboxamido)-penicillanic acid.

6-aminopenicillanic acid (6–APA, II) is prepared easily by numerous methods now available in the art. For example, the procedure of Alburn, Grant and Clark, U.S. 3,032,473, can be used.

The other starting material, the N-carboxyanhydrides of alicyclic and arylalicyclic amino acids (III) are prepared in several well-known ways, the most useful of which appears to be phosgenation of a suitable amino acid. These methods are outlined, for example, in the references cited in Journal of the American Chemical Society, 86, 3870 (1964).

In the preferred exercise of the method of the present invention, the 6-aminopenicillanic acid (6–APA), or a salt thereof, such as the sodium or potassium salt, is made up into a concentrated aqueous suspension and the pH is adjusted to the acid side of neutrality. The concentration employed is selected to insure that from about 5% to about 40% of the penicillanic acid or salt (calculated as acid) based on the water will be present. If necessary, because, for example, a salt is used, the pH is adjusted to the acid side of neutrality (below 7). It is preferred to raise the pH, if the free acid is used, to above about 5. Depending on the exact concentration, on the pH (approximately 5–7 is preferred), and on the temperature—from about 0° C. to about 70° C. is operative—some of the 6–APA will be in suspension and some in solution. The N-carboxyanhydride of the alicyclic or arylalicyclic amino acid then is added, preferably as a solid and especially preferably in divided batches of about equal weight. In contrast to prior teachings, the stoichiometrically-equivalent amount of the N-carboxyanhydride is added, and a large excess of 6–APA is not used. It is preferred throughout the procedure to stir the mixture very vigorously. It will be observed that the suspension thickens and the product precipitates at lower ends of the temperature range and at higher ends of the concentration range. As will be obvious to those skilled in the art, mixing lower concentrations, e.g. 5% at higher temperatures, e.g., 70° C., causes the condensation to go well (and rapidly), but it is desirable to allow precipitation to proceed at lower temperatures, such as at about 25° C. to insure that substantially all of the product is recovered. In any event, the precipitate is collected, for example by filtration, centrifugation, decantation or any obviously equivalent method, washed with, for example water, methanol, isopropanol and the like, dried and, if desired, converted to any lower hydrate in a known manner.

Several modifications in technique or practice are useful and will be described in the examples which follow. It will be seen that an anti-foam agent, such as capryl alcohol, can be of assistance, especially when vessel capacity is limited. Preparation of highly concentrated 6–APA suspensions may be facilitated if the free acid in water is treated with a base, such as sodium hydroxide, to form a complete solution of the sodium salt of 6–APA; this then is brought to neutrality or weakly acidic by addition of a strong mineral acid, such as hydrochloric acid. The extent of the reaction can be monitored by observing the evolution of carbon dioxide; when this ceases, the condensation is substantially complete.

DESCRIPTION OF THE PREFERRED EMBODIMENTS

The following examples are given by way of illustration and are not to be construed as limitations of this invention, variations of which are possible without departing from the spirit or scope thereof.

EXAMPLE 1

6-(1-aminocyclohexanecarboxamido)-penicillanic acid

A mixture of 700 g. of 6-aminopenicillanic acid (6–APA), 44 g. of NaHCO$_3$, 4 l. of distilled water, and several drops of capryl alcohol is stirred vigorously at 25° C. for a few minutes (until CO$_2$ from the bicarbonate stops evolving). Two batches of 180 g. of the N-carboxyanhydride of 1 - aminocyclohexanecarboxylic acid are then added at 20 minute intervals, and the third batch is added 5 minutes later. The mixture at this point has a pH of 6.4 and contains a very heavy precipitate. Stirring is continued vigorously for 30 minutes. After filtering, the product is washed first with 2 l. of cold water and finally with 1.8 l. of cold water. The product is dried in an air circulating oven at 45° C. for 1 day and 50° C. for a second day. It weighs 974 g. and has the infrared spectrum of the dihydrate. The theoretical yield is (377×700)/216=1222 g. The in-hand yield at this point is 80%. An additional crop of 52 g. is obtained by adjusting the mother liquor to pH 5.6 with HCl and concentrating to 1 l. This raises the overall yield to 84%.

EXAMPLE 2

6-(1-aminocyclopentanecarboxamido)-penicillanic acid

Thirty-five grams of 6–APA is slurried at room temperature with 35 ml. of water. The pH is raised to approximately 5.0 by addition of sodium bicarbonate (pH adjustment in a slurry is not exact, and for the present purpose, rough estimates will do; 1.2 g. brings it above 5.0 and a few drops of glacial acetic acid brings it back to 5.0). Three 8.33 g. portions of the N-carboxyanhydride of 1-aminocyclopentanecarboxylic acid are added at 20 minute intervals. After 90 minutes of vigorous stirring, CO$_2$ continues to evolve, so the mixture is kept in the refrigerator overnight. The wet solid is suspended in isopropanol and filtered. It is dried at room temperature under vacuum, giving 46.5 g. of the anhydrate. Hydroxamate assay of the β-lactam (6–APA standard) gives the calculated theoretical value. The overall yield for this one-step synthesis is 88%.

EXAMPLE 3

6-(1-aminocyclohexanecarboxamido)-penicillanic acid

Prepare at 22° C. a suspension of 1000 g. of 6–APA in 5 l. of distilled water. Add with stirring 60 g. of sodium bicarbonate and then a few ml. of capryl alcohol antifoaming agent. Next add 261 g. of the N-carboxyanhydride of 1-aminocyclohexane carboxylic acid and stir vigorously for 10 minutes. Add two additional batches of 261 g. of the NCA at 10 minute intervals, and stir very vigorously for 30 minutes after the final addition. Suspend the precipitate in 2.5 l. of cold distilled water, filter, and wash the filter cake with another 2.5 l. of cold water. Dry in an oven at 45° C. Dissolve the hydrate product in methanol (20% solution, weight/volume) at room temperature and, after a half hour, filter off the crystals of anhydrate. Dry in an oven under 50°.

EXAMPLE 4

6-(1-aminocyclopentanecarboxamido)-penicillanic acid

Prepare a suspension of 1000 g. of 6–APA and 61 g. of sodium bicarbonate in 2.9 l. of distilled water at room temperature. Add 3–4 ml. of capryl alcohol. Three 240 g. aliquots of N-carboxy-1-aminocyclopentanecarboxylic acid anhydride (cycloleucine NCA) are added with vigorous stirring at half hour intervals. The mixture is stirred for 2 hours after the final addition, and is then kept at about 5° C. overnight. It is then filtered, washed with 2 l. of distilled water, and dried at 45–50° C. Conversion to anhydrous penicillin is carried out by heating a 10% suspension in boiling methanol for 10 minutes.

EXAMPLE 5

6-(1-aminocyclohexanecarboxamido)-penicillanic acid

To a suspension of 830 g. of 6–APA (95%) in 2 l. of water at room temperature there is added with vigorous stirring 154 g. of NaOH. Stirring is continued until the 6–APA dissolves completely; the solution pH is then 7.5. The pH is then reduced to 6.7 by the addition of 55 ml. of concentrated HCl. There is then added 217 g. of the N-carboxyanhydride of 1-aminocyclohexanecarboxylic acid (NCA), and stirring is continued for 20 minutes during which precipitation begins. Another 217 g. of NCA is added, along with several ml. of capryl alcohol to control foaming. A final batch of 217 g. of NCA is added and the thick mixture is stirred very vigorously for 35 minutes more. The mixture is filtered, and the filler cake is washed with 1.0 l. of cold water and then with 0.5 l. of cold water. The product is dried for 65 hours at 40° C. in an air circulating oven. Yield: 856 g., assaying 95% pure (by hydroxamate assay vs. a laboratory standard), equivalent to 59% overall yield.

EXAMPLE 6

6-(1-aminocyclopentanecarboxamido)-penicillanic acid

Prepare a suspension of 1000 g. of 6–APA in 1000 ml. of distilled water at room temperature. Bring the suspension pH to 5.0–5.5 by the addition of about 10 g. of sodium bicarbonate. Add three 238 g. batches of the N-carboxyanhydride of 1-aminocyclopentanecarboxylic acid (NCA) at 8 minute intervals and stir vigorously for 2 hours. The reaction continues slowly for 3–8 hours and can be stirred occasionally during this time. When the evolution of carbon dioxide has stopped, resuspend the largely solid reaction mixture with the aid of about 500 ml. of 100% isopropanol and filter. Dry the filter cake at 45–55°.

EXAMPLE 7

6-(1-aminocyclohexanecarboxamido)-penicillanic acid

A mixture of 3.5 g. of 6–APA, 20 ml. of water, and 600 mg. of NaOH is stirred at 70° C. until complete solution is attained. There is then added with stirring 2.55 g. of N-carboxy-1-aminocyclohexane carboxylic acid anhydride. After all the reactants are dissolved the system is stirred for 5 minutes at 70° C. and then cooled to room temperature with continued stirring. A thick precipitate forms. It is suspended with the aid of isopropanol, filtered, and dried, giving 2.1 grams of the penicillin dihydrate.

EXAMPLE 8

6-(1-aminocyclopentanecarboxamido)-penicillanic acid

At 22° C., a mixture is prepared consisting of 12 grams of 6–APA, 0.73 gram of NaHCO$_3$, and 70 ml. of water. At twenty minute intervals there are added, with stirring, three 2.87 gram batches of N-carboxy-1-aminocyclopentane carboxylic acid anhydride. The system is allowed to stir for 30 minutes after the last addition. The insoluble product is collected and dried, giving 9.8 grams of the anhydrate penicillin.

EXAMPLE 9

The method of Example 7 is repeated with two modifications: the volume of water is lowered to 35 ml., and the NCA is added in six batches of 1.43 g. each. The product weighs 12.5 grams, contains 1% water (Karl Fischer assay) and has the infrared spectrum of the anhydrate.

EXAMPLE 10

The procedure of Example 1 is repeated with stoichiometrically-equivalent amounts of N-carboxyanhydrides of appropriately-substituted alicyclic and arylalicyclic amino acids and the following aminoalicyclic- and aminoarylalicyclic penicillins are obtained in substantially the same manner:

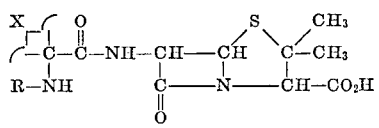

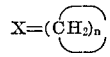

| n | R |
|---|---|
| 5 | CH₃ |
| 5 | CH₂CH₃ |
| 5 | CH(CH₃)₂ |
| 4 | —CH₂(CH₂)₄CH₃ |
| 2 | H |
| 3 | H |
| 6 | H |
| 7 | H |
| 8 | H |
| 9 | H |

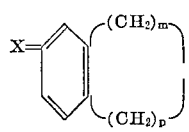

| m | p | R |
|---|---|---|
| 0 | 2 | H |
| 1 | 2 | H |
| 0 | 3 | H |
| 1 | 1 | CH₃ |

EXAMPLE 11

6-(indan-2-amino-2-carboxamido)penicillanic acid

Two grams of N-carboxy-indane-2-amino-2-carboxylic acid anhydride are added to a solution containing 5.3 grams of 6-APA per 100 ml., adjusted to pH 6.0 with triethylamine. The system is stirred overnight at room temperature, adjusted to pH 5.0, and filtered. The precipitate weights 6.6 g.

*Analysis.*—Theory for $C_{18}H_{21}N_3O_4S2H_2O$ (percent): C, 52.5; H, 6.08; N, 10.2. Found (percent): C, 52.6; H, 5.99; N, 10.1.

What is claimed is:

1. In a process for the preparation of a penicillin of the formula:

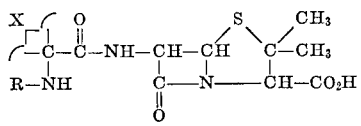

wherein R is hydrogen or lower alkyl and X is

wherein $n$ is a whole number of from 2 to 9; or

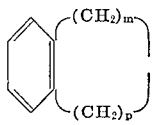

wherein $m$ is 0 or 1 and $p$ is a whole number of from 1 to 3, by condensing 6-amino-penicillanic acid with an N-carboxyanhydride of an alicyclic amino acid of the formula

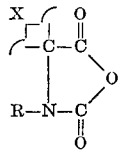

wherein X and R are as above defined in an aqueous medium until formation of said penicillin is substantially complete, and recovering said penicillin, the improvement which comprises adding a stoichiometrically equivalent amount of said N-carboxyanhydride to a concentrated aqueous medium containing from about 5% to about 40% by weight of said 6-aminopenicillanic acid at a temperature range of from about 0° C. to about 70° C., maintaining the mixture within said temperature range until formation and precipitation of said penicillin is substantially complete and collecting the precipitated penicillin.

2. A process as defined in claim 1 wherein said concentrated aqueous medium is maintained at a pH range of from about 5 to about 7.

3. A process as defined in claim 1 wherein said N-carboxyanhydride is added portionwise in from about two to about six substantially equal batches and the mixture is mixed vigorously during the addition and during the formation of said penicillin.

4. A process as defined in claim 1 wherein the N-carboxyanhydride is N - carboxy - 1 - aminocyclohexane-carboxylic acid anhydride.

5. A process as defined in claim 1 wherein the N-carboxyanhydride is N-carboxy - 1 - aminocyclopentane-carboxylic acid anhydride.

References Cited

UNITED STATES PATENTS 3,194,802  7/1965  Alburn et al. _____ 260—239.1

OTHER REFERENCES

Grant et al., Jour. Amer. Chem. Soc., vol. 86, pp. 3870–3873 (1964).

NICHOLAS S. RIZZO, Primary Examiner